(12) United States Patent
McVicker et al.

(10) Patent No.: US 8,585,375 B2
(45) Date of Patent: Nov. 19, 2013

(54) METHOD FOR LOCKING A STATOR LAMINATION IN A MOTOR

(75) Inventors: Van J. McVicker, Collinsville, OK (US); Nisarg Z. Patel, Claremore, OK (US); Larry J. Parmeter, Broken Arrow, OK (US)

(73) Assignee: Baker Hughes Incorporated, Houston, TX (US)

( * ) Notice: Subject to any disclaimer, the term of this patent is extended or adjusted under 35 U.S.C. 154(b) by 536 days.

(21) Appl. No.: 12/828,493

(22) Filed: Jul. 1, 2010

(65) Prior Publication Data
US 2011/0002799 A1    Jan. 6, 2011

Related U.S. Application Data

(60) Provisional application No. 61/222,412, filed on Jul. 1, 2009.

(51) Int. Cl.
*F04B 17/00* (2006.01)

(52) U.S. Cl.
USPC ................................. 417/410.1; 310/91

(58) Field of Classification Search
USPC .................... 417/410.1; 310/89, 90, 91
See application file for complete search history.

(56) References Cited

U.S. PATENT DOCUMENTS

| | | |
|---|---|---|
| 1,820,531 A | 3/1927 | Engelhardt |
| 2,424,443 A | 12/1944 | Evans |
| 3,048,116 A | 8/1962 | Konrad |
| 3,153,382 A * | 10/1964 | Van Blarcom, Jr. ....... 417/423.3 |
| 3,313,967 A | 4/1967 | Ross |
| 4,007,867 A | 2/1977 | Wielt |
| 4,513,215 A | 4/1985 | Del Serra |
| 4,521,708 A | 6/1985 | Vandevier |
| 4,564,779 A | 1/1986 | Terry |
| 4,577,128 A | 3/1986 | Gould |
| 4,578,608 A | 3/1986 | Mech |
| 4,638,198 A | 1/1987 | Cochran |
| 5,398,397 A | 3/1995 | Johnson |
| 5,534,736 A * | 7/1996 | Johnson .......................... 310/91 |
| 6,133,666 A | 10/2000 | Hollenbeck |
| 6,225,719 B1 | 5/2001 | Hallundbaek |

(Continued)

FOREIGN PATENT DOCUMENTS

| | | |
|---|---|---|
| JP | 2002027688 | 1/2002 |
| JP | 2005198422 | 7/2005 |
| JP | 2007169783 | 7/2007 |

*Primary Examiner* — Charles Freay
*Assistant Examiner* — Patrick Hamo
(74) *Attorney, Agent, or Firm* — Bracewell & Giuliani LLP

(57) ABSTRACT

An electrical submersible pumping system (ESP) having a stator lamination stack that is anchored to prevent the stack from spinning. The ESP includes a motor section having a housing with an axial bore. A groove circumscribes an inner surface of the housing and a snap ring is set in the groove. A portion of the snap ring projects into the bore and exerts an axial compression force onto the lamination stack The snap ring includes a gap that aligns with a bead of material that is set in the groove; engagement between the bead and gap prevents the snap ring from spinning in the groove. The bead, that in an embodiment is a weld, can extend across all or a portion of the groove and can also provide coupling between the lamination stack and the housing.

18 Claims, 5 Drawing Sheets

(56) References Cited

U.S. PATENT DOCUMENTS

| | | |
|---|---|---|
| 6,407,474 B1 | 6/2002 | Mahn |
| 6,634,081 B2 | 10/2003 | Kohler |
| 6,700,252 B2 | 3/2004 | Fleshman |
| 6,794,788 B1 | 9/2004 | Smith |
| 6,969,940 B2 | 11/2005 | Dalrymple |
| 7,062,841 B2 | 6/2006 | Neuenschwander |
| 7,168,486 B2 | 1/2007 | Hackworth |
| 2007/0096571 A1 | 5/2007 | Yuratich |

* cited by examiner

Fig. 5
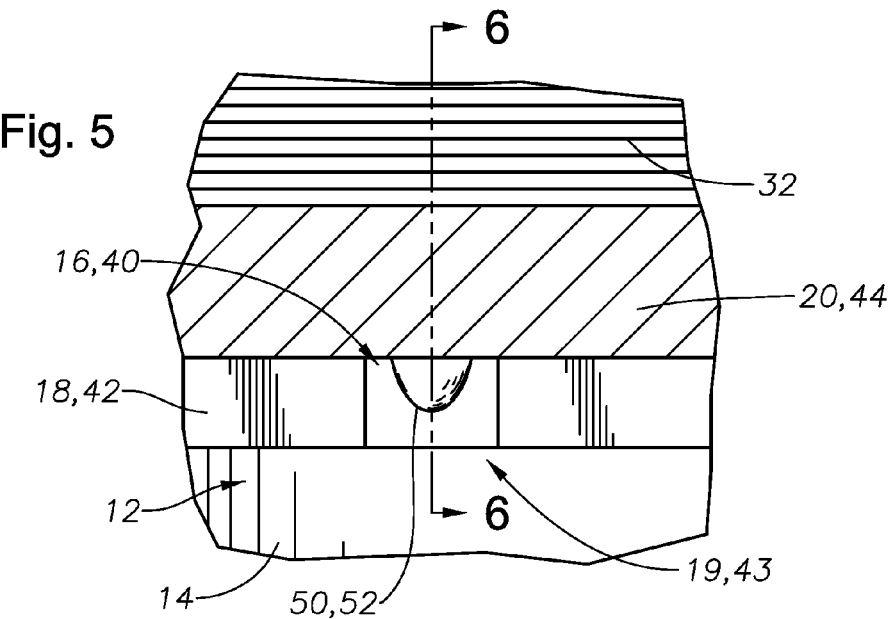
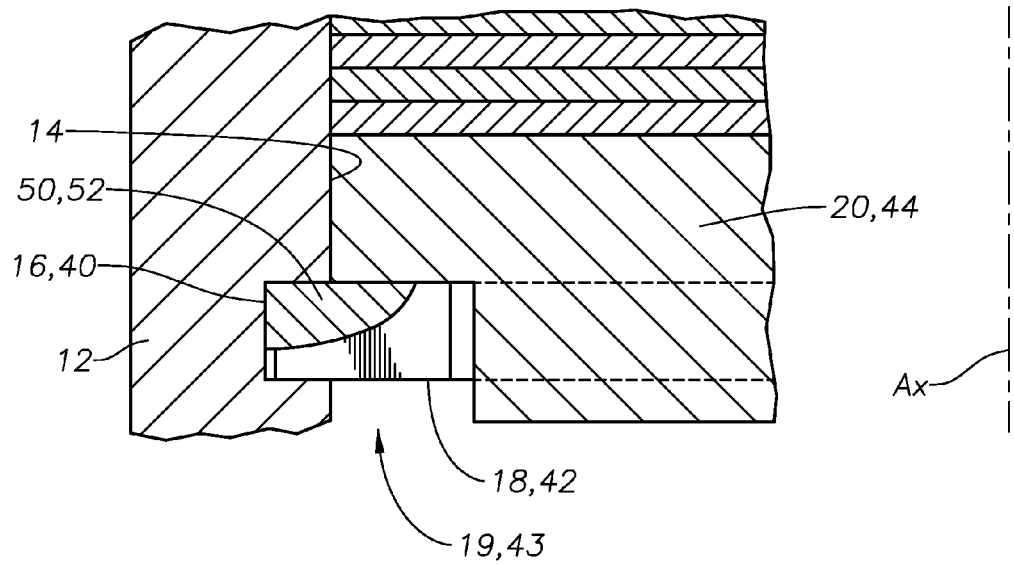
Fig. 6

METHOD FOR LOCKING A STATOR LAMINATION IN A MOTOR

CROSS REFERENCE TO RELATED APPLICATIONS

This application claims priority to and the benefit of U.S. Provisional application No. 61/222,412 filed Jul. 1, 2009, the full disclosure of which is hereby incorporated by reference herein.

BACKGROUND

1. Field of Invention

The present disclosure relates to downhole pumping systems submersible in well bore fluids. More specifically, the present disclosure concerns preventing rotation of stators in an electrical submersible pump with mechanical anchoring.

2. Description of Prior Art

Submersible pumping systems are often used in hydrocarbon producing wells for pumping fluids from within the wellbore to the surface. These fluids are generally liquids and include produced liquid hydrocarbon as well as water. One type of system used in this application employs an electrical submersible pump (ESP). ESPs are typically disposed at the end of a length of production tubing and have an electrically powered motor. Often, electrical power may be supplied to the pump motor via a power cable. ESPs usually are made up of a pump motor at its lowermost section with a seal section adjacent the pump motor. The seal section is used for equalizing pump system internal pressure with ambient to minimize the pressure differential across the pump system seals.

Motors for electrical submersible pump systems are typically formed by stacking a series of annular stator laminations inside a pump motor housing. Grooves are normally formed within the housing at the top and bottom terminal ends of a lamination stack. The grooves are configured to receive a snap ring, where the snap ring inner diameter extends into the pump motor from the housing inner diameter. Forming the motor typically comprises inserting the snap ring located at the bottom of the housing, then adding the lamination stack within the housing. The laminations are then compressed, with a press or some other mechanical device; while the laminations are still under compression the top snap ring is inserted. After the pressure on the lamination stack is released, the stack will slightly spring back and exert an axial force on both top and bottom snap rings, where the opposing force is in opposite directions. This force on the snap rings will slightly stretch the housing along its length to create an axial force intended to prevent lamination spin during motor operation.

The ESP pump motors also comprise a rotor attached to a pump motor shaft. The rotor also consists of corresponding rotor laminations usually coaxially within. The stator lamination stack and the rotor lamination stack include openings that axially run along the length of the motor, wherein the openings contain wires, or other electrical conducting elements that form corresponding coils in each of the rotor and stator lamination stack. Typically the coil in the stator lamination stack is energized to form an electrical field that through electromagnetic forces produces a rotation in the rotor stack and thus correspondingly rotates the pump motor shaft.

SUMMARY

Disclosed herein is a motor for an electrical submersible pumping system. In an example embodiment the motor includes a housing having a bore formed along its axis. The housing includes a groove on an inner surface that circumscribes the bore. A curved snap ring with a gap is in the groove; a portion of the ring extends inward into the bore. A stator is set in the housing, with an end contacting the portion of the ring in the bore. The stator is made of a stack of thin laminations. The snap ring is oriented so that material adhered to the housing and in the groove projects radially inward into the gap. Optionally, the material is a weld that is welded to the stack of laminations. In an alternative embodiment, the motor can have a second groove, snap ring, gap, and adhered material set in the housing at the other end of the stator stack. The stack of laminations can then be compressed between the two snap rings. The material can extend partially, or fully, across the groove in a direction parallel with an axis of the housing. The end of the stack of laminations and along an outer periphery of the stack of laminations can have a recess formed for receiving the snap ring Alternatively, the material can be provided partially or fully from the opening of the groove to the bottom of the groove.

Another embodiment of an electrical submersible pumping system includes a motor section with a housing having a bore along its axis. A groove is formed inside the motor housing around the bore and a snap ring is in the groove. A portion of the snap ring sticks into the bore. The snap ring is an elongated member that is curved so that the ends of the snap ring are spaced apart to define a gap between the ends. Inside the housing is a stack of laminations that form a stator. The stack is axially compressed against the snap ring. The snap ring is oriented so the gap aligns with a weld in the groove. The weld extends from within the groove to an end of one of the laminations. A rotor is inserted in the stack of laminations. The assembly also includes pump section and a pump shaft connected between the rotor and the pump section. Optionally, the weld adheres to an upper side and an outer side of the groove and protrudes inward into the bore of the housing or can extends across a radial depth in the groove. Alternatively, the weld extends an axial depth of the groove. The weld can be in non-adhering contact with the snap ring. The pumping system can include an annular recess on the end of one of the laminations configured to fit with the snap ring. A second, and similar, groove, snap ring, gap, and weld can be included on the opposite end of the stator so that the stack of laminations is compressed between the first and second snap rings.

Also disclosed herein is a method of forming a motor for an electrical submersible pumping system. In an example embodiment, the method includes providing an annular motor housing with an axial bore and a groove formed in an inner surface of the housing circumscribing the bore. The method also includes providing a motor stator and a snap ring. The snap ring is a member curved to have a circumference less than 360° so that a gap is between the ends. The method also includes setting the snap ring in the groove so that an inner diameter of the snap ring is in the bore and inserting the stator into the housing. An end of the stator contacts against the inner diameter of the snap ring in the bore. Also included in the method is adhering a bead of material in the groove and aligned with the gap. In an example embodiment, the bead of material is a weld; the weld can extend partially along a portion of the groove aligned with a path perpendicular to an axis of the housing; or can extend across the portion of the groove aligned with a path perpendicular to an axis of the housing; and can also extend across the portion of the groove aligned with a path parallel to an axis of the housing. The stator can be a stack of laminations with a winding through the stack of laminations. In an alternative embodiment, the method can also include inserting an electrically responsive cylindrical rotor that is attached to an end of a shaft that couples to a pump.

BRIEF DESCRIPTION OF THE DRAWINGS

FIG. 5 is a sectional view of a portion of the motor taken along line 5-5 of FIG. 2.

FIG. 6 is a sectional view of a portion of the motor of taken along line 6-6 of FIG. 5.

DETAILED DESCRIPTION OF THE INVENTION

Figure 1:
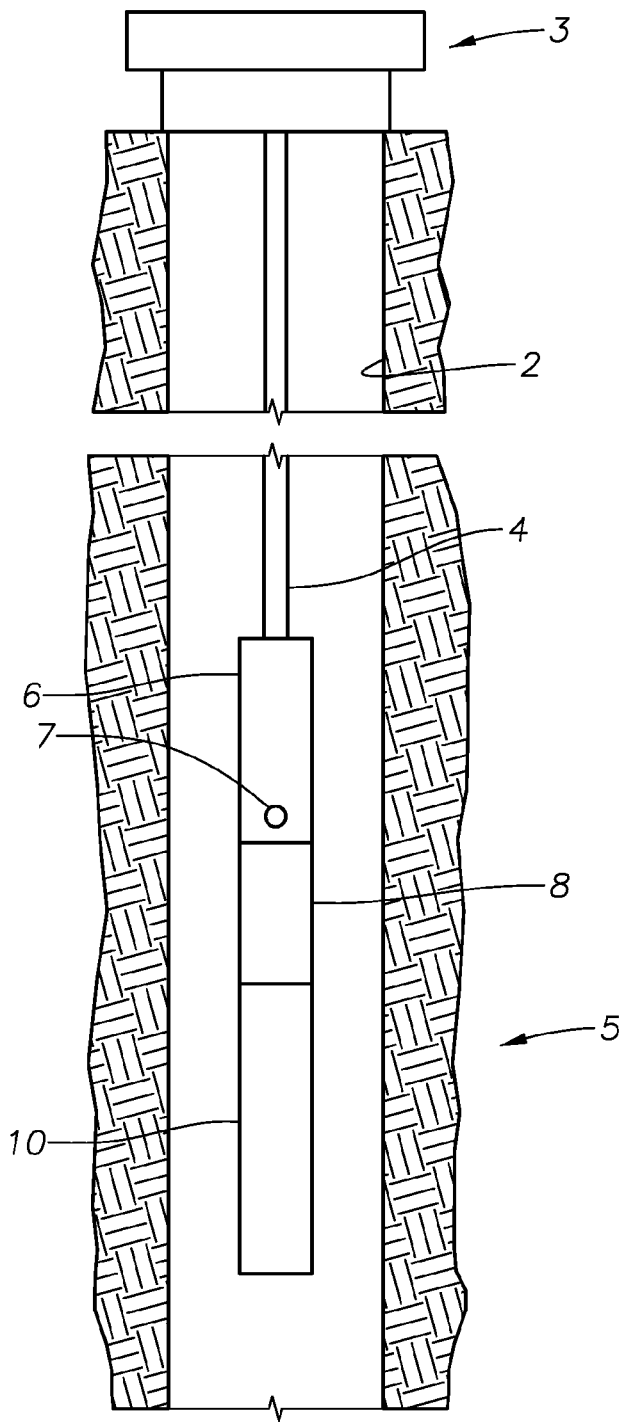
FIG. 1 is a side partial sectional view of an electrical submersible pumping system (ESP) in accordance with the present disclosure disposed in a wellbore.

Shown in a side partial sectional view in FIG. 1 is a wellbore 2 capped with a wellhead 3 and production tubing 4 depending from the wellhead 3 into the wellbore 2. An electrical submersible pumping system (ESP) 5 is shown attached on a lower end of the production tubing 4. In the example embodiment of FIG. 1, the ESP 5 includes a motor section 6 for pumping fluids from the wellbore 2 into the production tubing 4 and to the wellhead 3. Fluid (not shown) in the wellbore 2 flows into the pump section 6 through an inlet 7 shown formed on an outer surface of the pump section 6. On a lower end of the pump section 6 is a seal section 8 for equalizing pressure within the ESP 5 to ambient conditions. A motor section 10 is shown on a lower end of the seal section 8 that includes a motor (not shown) for driving impellers (not shown) in the pump section 6.

Figure 2:
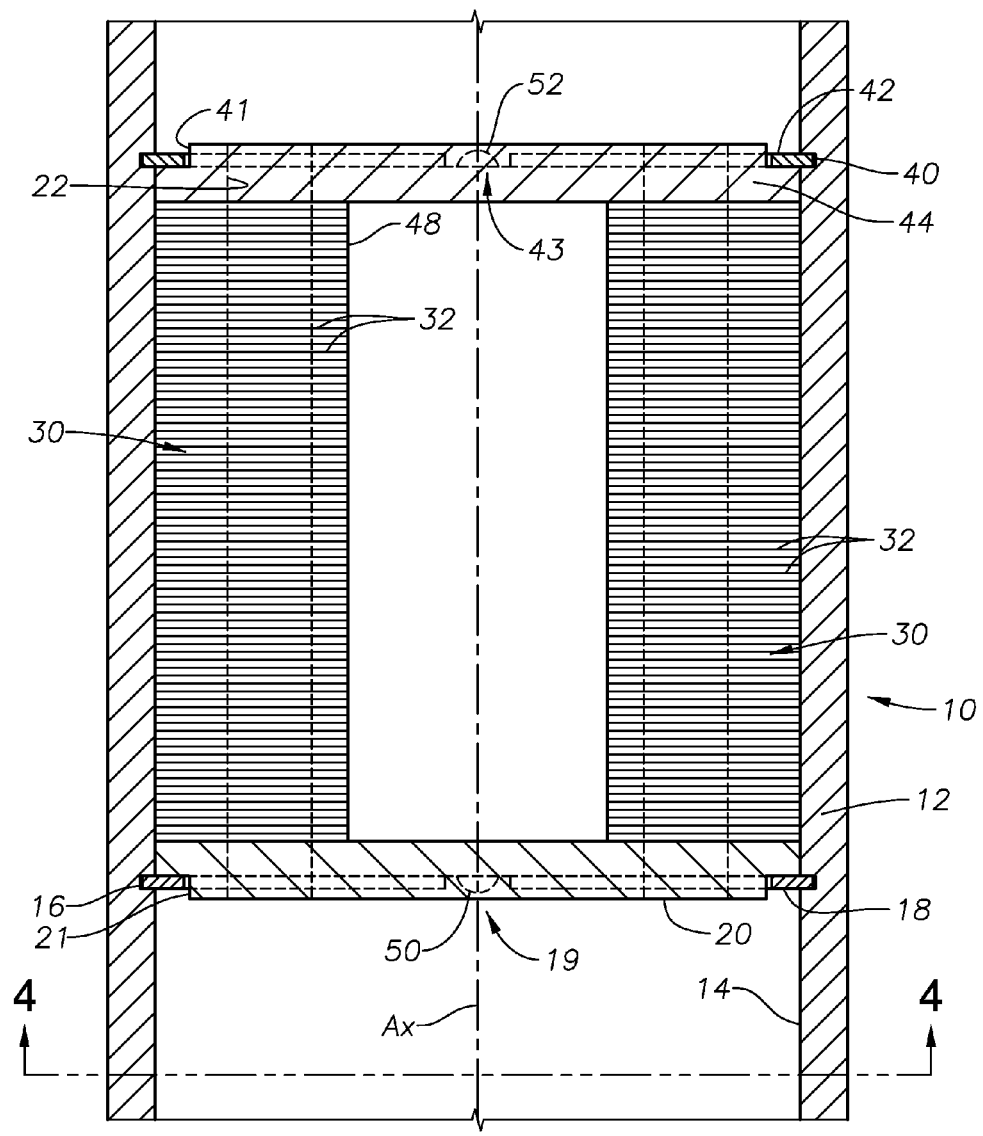
FIG. 2 is a sectional view of a portion of a motor assembly, in accordance with an embodiment of the invention.

Referring to FIG. 2, a portion of the motor section 10 of the ESP 5 is illustrated in a side sectional view. The motor section 10 shown includes a cylindrical housing 12 having an inner surface 14. Coaxially disposed within the housing 12 is a stack of thin ring-like laminations 32 that when assembled as shown provide an inner bore circumscribing the motor axis $A_x$. The stack of laminations 32 are supported within the housing 12 by a thicker and lowermost lamination 20. The stack of laminations 32 forms an annular stator 30 within the motor section 10. A lower circumferential groove 16 is formed on the inner surface 14 of the housing 12. A lower retainer ring or snap ring 18 is shown set within the groove 16. The lower snap ring 18 of FIG. 2 is a generally annular member with a gap 19 along a portion of its circumference (FIG. 2). In one example the gap 19 is approximately ⅝ of an inch wide but can vary. The lower snap ring 18 protrudes radially inward from the groove 16 and into a recess 21 provided along the periphery of lamination 20 and on a lower surface.

Figure 3:
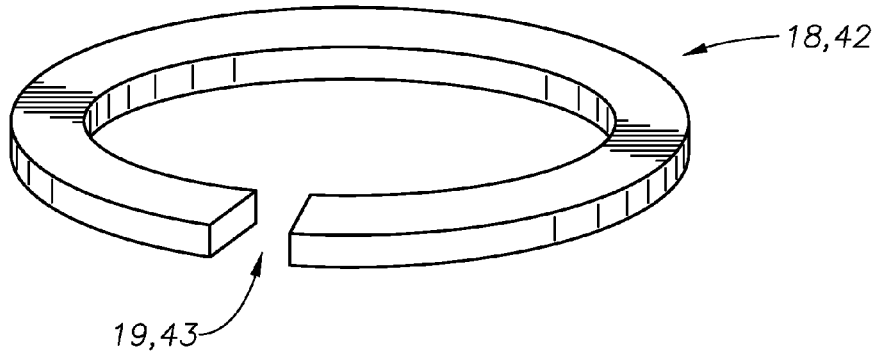
FIG. 3 is a side perspective view of an embodiment of the snap ring of FIG. 2.

Retention at the upper end of stack of laminations 32 is provided by an upper lamination 44, shown coaxially coupled within the housing 12 by a ring like snap ring 42 (FIG. 3). The snap ring 42 is shown set in a groove 40 provided on the inner surface 14 of the housing 12 above the stack of laminations 32. The snap ring 42 extends radially inward from the groove 40 into a recess 41 formed along the outer circumference on the lamination 44 and on an upper surface. As shown in perspective view in FIG. 3, snap rings 42 includes a gap 43 similar to the gap 19 of snap ring 18.

Referring back to FIG. 2, in an example embodiment, the stator 30 is fabricated by setting the lower snap ring 18 into the groove 16 and inserting the stack of laminations 32 into the housing 12 where they are supported on the lower snap ring 18. Using a ram (not shown), the stack of laminations 32 with the lower thick end lamination 20 are compressed against the lower snap ring 18. The upper snap ring 42 is set within the upper groove 40 and the ram is released. Releasing the ram creates a spring-like effect in the stator laminations 32, with the previously compressed stator laminations 32 tending to push outward against the lower and upper end thick laminations 20, 44 secured by the snap rings 18, 42. The stator 30 is thus rigidly mounted within housing 12.

Figure 4:
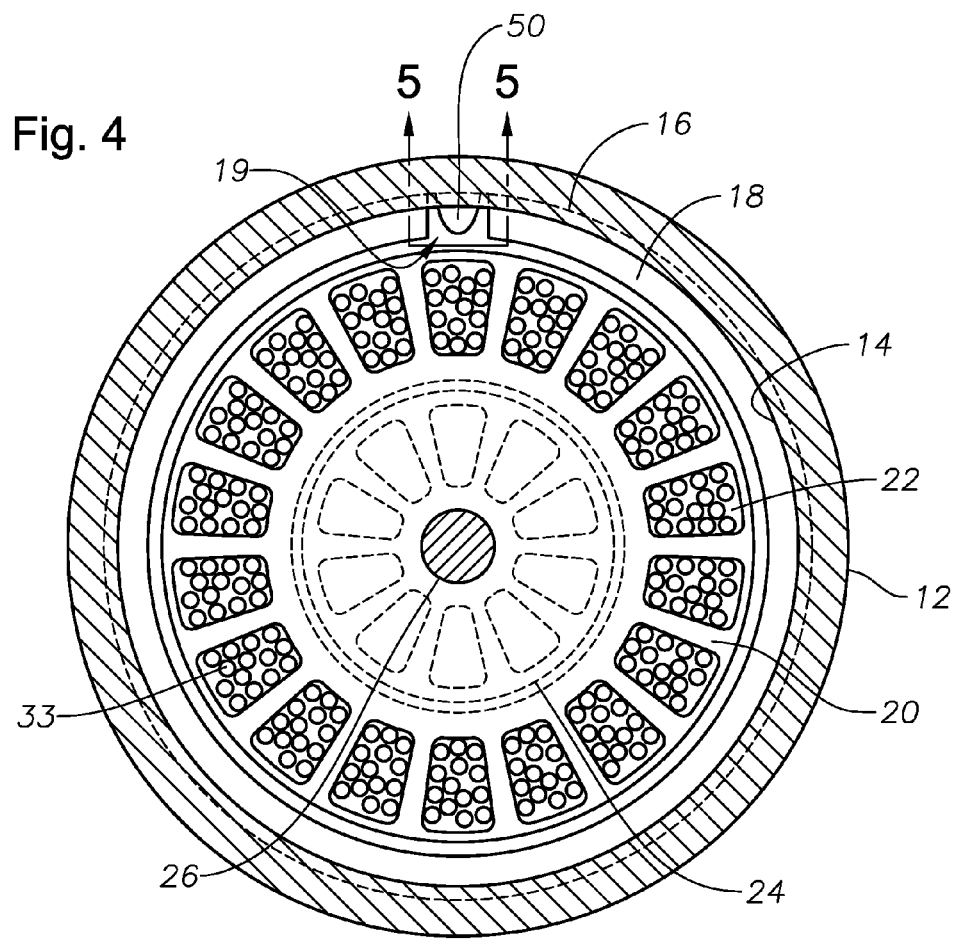
FIG. 4 is a top view of the motor assembly of FIG. 2.

Shown in the axial cutaway view of FIG. 4 are slots 22 formed through the lower thick end lamination 20 and stator laminations 32 that form passages axially through the stack of laminations. In an embodiment the disks or laminations 32 of the stator 30 comprise magnetic steel and may be insulated from each other by conventional coatings. The lower and upper thick end laminations 20, 44 can also be made of magnetic steel. Wires 33 extend through the passages that are wound in a conventional manner and into which epoxy can be introduced. The wound wires 33 form windings that can be energized by a supply of electrical current to create an alternating electromagnetic field. A rotor 24 is shown coaxially inserted within the stack of laminations 32 that connects to and circumscribes an elongated shaft 26. In an example embodiment, the rotor 24 includes a series of stacked laminations and made from a material that is responsive to an electromagnetic field, such as a magnetic steel. In an example embodiment, motor section 10 operation includes energizing the windings to rotate the rotor 24 and shaft 26. The shaft 26 drives impellers (not shown) in the pump section 6 for drawing fluid into the ESP 5 and pumping the fluid from a borehole.

During start-up, the rotor torque experienced by the motor is approximately 3.5 times more than running torque. The outward force of the stator laminations 32 against the thick end laminations 20, 44 is generally sufficient to prevent the stack of laminations 30 from spinning. However, slight differences between the fabrication of one motor to the next can inadvertently lower the outward force generated by the lamination stack 32. If the outward force of the lamination stack 32 is sufficiently lowered, the stator 30 can spin within the housing 12 and cause failure in the motor section 10. Typically, spinning occurs during start up and is between the snap ring 18 and a thick end lamination 20.

In an embodiment of the motor section 10 described herein, spinning of the stator 30 can be mitigated by adding material in the gap 19 of the lower snap ring 18. Optionally, the material can be set in the gap 43 of the upper snap ring 42, or be set in both gaps 19, 43. Illustrated in the example embodiment of FIG. 2, the material is made up of welds 50, 52 shown provided within the grooves 16, 40 adjacent the lower and upper end laminations 20, 44. The welds 50, 52 can be made after releasing the ram that compresses the stack laminations 32. The gaps 19, 42 on the snap ring 18 provide a space within the grooves 16, 40 for the welds 50, 52.

Referring now to FIG. 5 both welds 50, 52 are shown for simplicity. The welds 50, 52 are illustrating adhering to the lower and upper thick end lamination 20, 44 and to the housing 12, thereby coupling the lower and upper end laminations 20, 44 to the housing 12. The snap rings 18, 42 may contact the welds 50, 52, be spaced apart from the welds 50, 52, or be adhered to the welds 50, 52.

Figure 7:
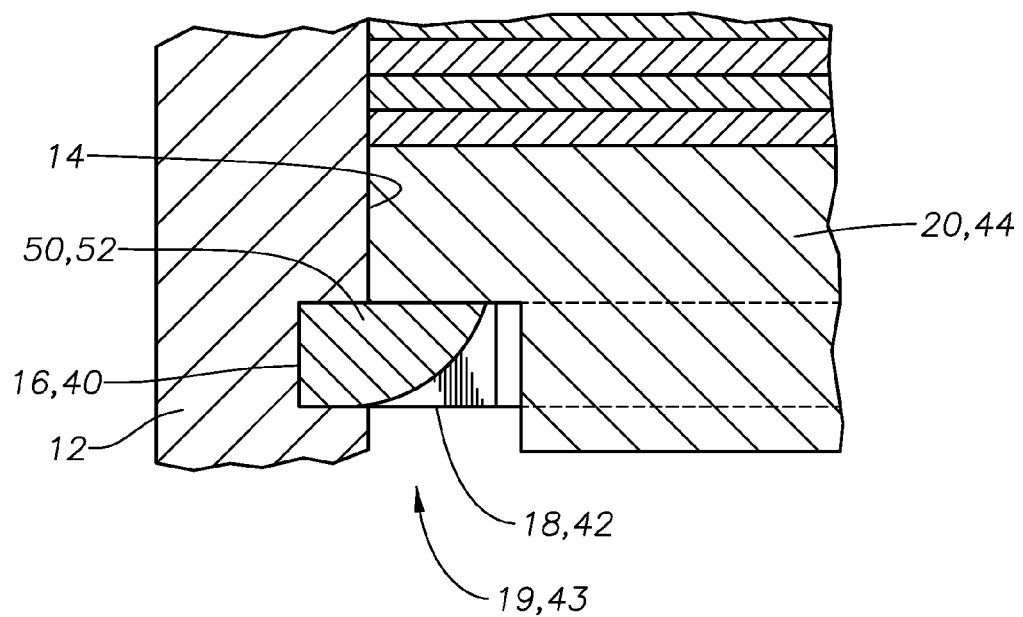
FIG. 7 is sectional view of an alternative embodiment of the embodiment of FIG. 6.

As shown in FIG. 6, each weld 50, 52 can be in each respective groove 16, 40 oriented along a path perpendicular to the axis $A_x$ of the motor 10. However, in the example embodiment of FIG. 6, the height of each weld 50, 52 is less than the height of the grooves 16, 40. In an alternate embodiment illustrated in side sectional view in FIG. 7, each weld 50, 52 is shown extending the entire height of each groove 16, 40, and the upper and lower surfaces of the grooves 16, 40 along a path perpendicular to the axis $A_x$ of the motor 10 Rotating the snap rings 18, 42 is prevented by contact between ends of the snap rings 18, 42 and the welds 50, 52. Because the thick end laminations 20, 44 are coupled to the housing 12 by the welds 50, 52, the thick end laminations 20, 44 also cannot rotate or spin. Preventing the stator 30 and individual stator laminations 32 from spinning thus can advantageously prevents premature failure of the ESP motor during operations, including at start-up. In example embodiments of FIGS. 6 and 7, the area of the welds 50, 52 is less than the area of the snap rings 18, 42.

By welding the end laminations 20, 44 to the inner portion of the housing 14, the possibility of the stator stack 30 spinning is dramatically reduced because spinning tends to occur at the interface of the snap rings 18, 42 with the end laminations 20, 44. Further, welding the end laminations 20, 44 does not adversely affect the integrity of the individual stator laminations 32 as the epoxy and windings in the stator slots 22 are sufficiently strong to prevent the individual stator laminations 32 from spinning under start-up conditions.

In an example embodiment, the welds 50, 52 are formed using a metal inert gas (MIG) welder. For housings 12 formed of carbon steel, a 7018 electrode or 7018 MIG wire. The 7018 electrode or 7018 MIG wire can also be used for housings 12 having chrome; however, the housing 12 should be heated to around 350 F prior to welding. Excess weld material or slag can be removed by grinding or a chisel.

While the invention has been shown in only one of its forms, it should be apparent to those skilled in the art that it is not so limited but is susceptible to various changes without departing from the scope of the invention.

What is claimed is:

1. An electrical submersible pumping system comprising:
   a pump section;
   a motor section connected to the pump section by a shaft and that comprises,
   a housing having an axial bore;
   a groove formed inside the housing and circumscribing the bore;
   a curvilinear snap ring set in the groove, a portion of which projects radially inward into the bore;
   a stack of laminations in the housing that define a stator and are axially compressed against the portion of the snap ring within the bore;
   a gap at an angular position in the snap ring;
   material adhered to the housing in the groove and projecting radially inward into the gap;
   wherein the groove, snap ring, gap, and material respectively comprise a first groove, a first snap ring, a first gap, and a first material; and
   the motor further comprising a second groove formed inside the housing and circumscribing the bore, a second snap ring set in the second groove and having a portion that projects radially inward from the second groove and into the bore, and a second material adhered to the housing in the second groove and projecting radially inward into the second gap, and wherein the stack of laminations is compressed between the first and second snap rings.

2. The pumping system of claim 1, wherein the first and the second material comprises a weld and is further adhered to the stack of laminations.

3. The pumping system of claim 1, wherein the first and second material extends partially across the first and second grooves, respectively, in an axial direction.

4. The pumping system of claim 1, wherein the first and second material extends fully across the first and second groves, respectively, in an axial direction.

5. The pumping system of claim 1, wherein a recess is provided on each end of the stack of laminations and alone an outer periphery of the stack of laminations and each of the recesses configured to receive therein the portion of one of the snap rings that projects radially into the bore.

6. The pumping system of claim 1, wherein the first and second material extends into the first and second grooves, respectively, a full radial depth of each of the first and second grooves.

7. An electrical submersible pumping system comprising;
   a motor section comprising:
   a motor housing having an axial bore,
   a groove rimmed inside the motor housing and circumscribing the bore,
   a snap ring in the groove, with a portion that extends into the bore and comprising an elongated member that is curved so that the ends of the snap ring are spaced apart to define a gap therebetween;
   a stack or laminations in the housing that define a stator and are axially compressed against the portion of the snap ring within the bore;
   a gap at an angular position in the snap ring;
   a weld adhered within the groove, to the housing and to an end oboe of the laminations and positioned in the gap; and
   a rotor coaxially disposed within the stack of laminations;
   a pump section; and
   a pump shaft connected between the rotor and the pump section.

8. The pumping system of claim 7, wherein the weld adheres to an upper side and an outer side of the groove and protrudes inward into the bore of the housing.

9. The pumping system of claim 7, wherein the weld extends across it radial depth in the groove.

10. The pumping system of claim 7, wherein the weld extends an axial depth of the groove.

11. The pumping system of claim 7, wherein the weld is in non-adhering contact with the snap ring.

12. The pumping system of claim 7, wherein an annular recess is provided on the end of one of the laminations and configured to receive therein the portion of the snap ring that projects radially into the bore.

13. The pumping system of claim 7, wherein the groove, snap ring, gap, and material bead respectively comprise a first groove, a first snap ring, a first gap, and a first weld, the system further comprising a second groove formed inside the motor housing and circumscribing the bore, a second snap ring set in the second groove and having, to portion that projects radially inward front the second groove and into the bore, and a second weld adhered to the motor housing in the second groove and to a second end of one of the laminations and positioned in the gap; and wherein the stack of laminations is compressed between the first and second snap rings.

14. A method of forming a motor for an electrical submersible pumping system comprising:
   providing an annular motor housing with an axial bore and a groove formed in an inner surface of the housing circumscribing the bore, a motor stator, and a snap ring comprising a curved elongated member having ends and a circumference less than 360° to define a gap between the ends;

setting the snap ring in the groove so that an inner diameter of the snap ring is in the bore;

inserting the stator into the housing and contacting an end of the stator against the inner diameter of the snap ring in the bore; and adhering a bead of material in the groove and aligned with the gap.

15. The method of claim 14, wherein the bead of material comprises a weld that extends partially along a portion of the groove aligned with a path perpendicular to an axis of the housing.

16. The method of claim 14, wherein the bead of material comprises a weld that extends across the portion of the groove aligned with a path perpendicular to an axis of the housing.

17. The method of claim 14, wherein the bead of material comprises a weld that extends across the portion of the groove aligned with a path parallel to an axis of the housing.

18. The method of claim 14, wherein the stator comprises a stack of laminations and a winding through the stack of laminations, the method further comprising inserting an electrically responsive cylindrical rotor that is attached to an end of a shaft that couples to a pump.

* * * * *